US010613420B2

(12) United States Patent
Ali

(10) Patent No.: US 10,613,420 B2
(45) Date of Patent: Apr. 7, 2020

(54) HEAT SPREADER FOR CAMERA

(71) Applicant: GoPro, Inc., San Mateo, CA (US)

(72) Inventor: Ihab A. Ali, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 475 days.

(21) Appl. No.: 15/383,963

(22) Filed: Dec. 19, 2016

(65) Prior Publication Data

US 2018/0039162 A1 Feb. 8, 2018

Related U.S. Application Data

(60) Provisional application No. 62/371,512, filed on Aug. 5, 2016.

(51) Int. Cl.
| | | |
|---|---|---|
| *G03B 17/55* | (2006.01) | |
| *H04N 5/225* | (2006.01) | |
| *G02B 7/02* | (2006.01) | |

(52) U.S. Cl.
CPC ............. *G03B 17/55* (2013.01); *G02B 7/028* (2013.01); *H04N 5/2252* (2013.01); *H04N 5/2253* (2013.01); *H04N 5/2254* (2013.01)

(58) Field of Classification Search
CPC .... G03B 17/55; H04N 5/2253; H04N 5/2252; H04N 5/2254; G02B 7/028
See application file for complete search history.

(56) References Cited

U.S. PATENT DOCUMENTS

| | | | | |
|---|---|---|---|---|
| 2005/0099521 A1* | 5/2005 | Bleau | .................... | H04N 5/2252 348/340 |
| 2007/0002148 A1* | 1/2007 | Takahashi | ............ | H04N 5/2253 348/219.1 |
| 2011/0051374 A1* | 3/2011 | Chen | .................... | H04N 5/2252 361/709 |
| 2013/0162893 A1* | 6/2013 | Hirota | .................... | H04N 5/225 348/360 |
| 2014/0055671 A1* | 2/2014 | Kawamura | .......... | H04N 5/2252 348/374 |
| 2014/0362286 A1* | 12/2014 | Komi | .................. | G06K 7/10732 348/374 |
| 2016/0174408 A1* | 6/2016 | Tolbert | ................. | H05K 1/0209 348/373 |
| 2017/0214830 A1* | 7/2017 | Tang | ...................... | G03B 17/55 |

* cited by examiner

*Primary Examiner* — Timothy J Henn
(74) *Attorney, Agent, or Firm* — Young Basile Hanlon & MacFarlane, P.C.

(57) ABSTRACT

A camera system includes a camera with a lens assembly and image processing electronics internal to the camera housing. The lens assembly and image processing electronics are sensitive to thermal gradients within the camera body. The image processing electronics are coupled to a thermal management system that transfers thermal energy away from the electronics towards a heat diffuser. The thermal management system comprises a heat controller with a heat source, an offset arm, and a heat exchange. The thermal energy moves from the heat source to the heat exchange via the offset arm. The thermal management system also manages heat transfer between auxiliary electronic components and the image processing electronics. The thermal management system is constructed of materials that react to the compressive forces created on the system during camera assembly.

20 Claims, 9 Drawing Sheets

HEAT SPREADER FOR CAMERA

This application claims a benefit of, and priority to, U.S. Patent Application No. 62/371,512, entitled "Heat Spreader for Camera" and filed on Aug. 5, 2016. The contents of U.S. Patent Application No. 62/371,512 are incorporated by reference herein in its entirety.

BACKGROUND

Field of Art

This disclosure generally relates to a camera, and more specifically, to a heat spreader for thermal management in a camera.

Description of the Related Art

Digital cameras are becoming faster and more powerful. As their capabilities improve, the processing power consumed to enable the faster speeds and greater resolution of modern digital cameras has increased significantly. When a digital camera is used over a long period of time, such as while capturing a video, the temperature of the electronics increases as a portion of the electrical energy is converted to thermal energy by resistive heating. Thermal expansion of materials near the heating electronics causes shifts in the lens assembly that interferes with the quality of images obtained by the detectors in the camera. However, existing camera systems do not provide an efficient mechanism for transferring heat away from the lens assembly for subsequent dissipation.

BRIEF DESCRIPTION OF DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
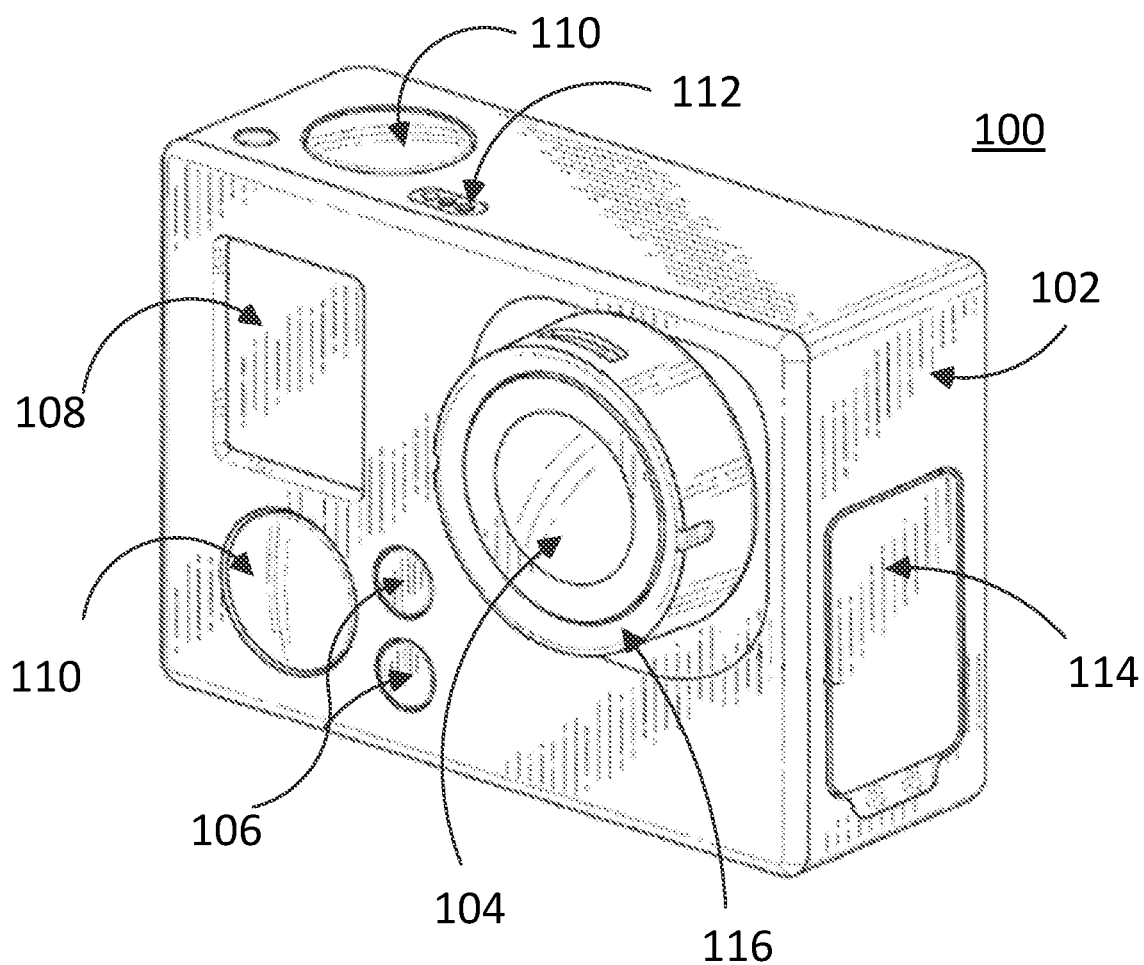
FIG. 1 illustrates a perspective view of a camera with a heat spreader, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera may comprise a camera body having a camera lens structured on a front surface of the camera body, and an image sensor and electronics (e.g., imaging electronics, power electronics, etc.) internal to the camera body for capturing images via the camera lens and/or performing other functions. During assembly, the focal plane of the lens is aligned with the image plane of the sensor. Resistive heating of the image sensor and electronics may create a displacement of the image sensor away from the image plane of the sensor resulting in reduced quality images.

However, the camera can be designed with a thermal management system that moves thermal energy away from the image sensor and thermally sensitive optics. In particular, a heat controller that thermally couples the processing electronics to internal heat diffusers and external heat sinks helps mitigate thermal expansion effects changing the plane of the image sensor. The system simultaneously prevents thermal energy from other internal camera components from moving towards the image sensor and lens components.

The heat controller can consist of three parts: a heat source, for thermally coupling to the image sensor electronics; a heat exchange, for dissipating heat from the image sensor via the heat source; and an offset arm, for coupling the heat source to the heat exchange. The heat source accepts thermal energy from the image processing electronics which is then thermodynamically transferred along the offset arm to the heat exchange for dissipation. The thermal management system may further limit heat produced by auxiliary electronics systems within the camera body from thermodynamically transferring towards the image sensor.

Finally, the thermal management system may be constructed from materials that utilize the compressive forces exerted on the internal camera components during assembly to further aid in heat transfer. For example, the offset arm may be mechanically flexible to allow for direct thermal coupling between the heat exchange and a heat diffuser when compressed during assembly, and the heat controller may use thermally compressive foam and pressure sensitive adhesives that control thermal transfer from auxiliary electronics components to the heat controller.

Example Camera Configuration

FIG. 1 illustrates an embodiment of an example camera 100 that may include a thermal management system for transferring heat away from camera optics and electronics. The camera 100 may comprise a camera body 102 having a camera lens 104 structured on a front surface of the camera body, various indicators on the front of the surface of the camera body 102 (such as LEDs, displays, and the like), various input mechanisms (such as buttons, switches, and touch-screen mechanisms), and electronics (e.g., imaging electronics, power electronics, etc.) internal to the camera body 102 for capturing images via the camera lens and/or performing other functions. The camera 100 may be configured to capture images and video, and to store captured images and video for subsequent display or playback.

The camera 100 can include various indicators, including the LED lights 106 and the LED display 108. The camera 100 can also include buttons 110 configured to allow a user of the camera to interact with the camera, to turn the camera on, and to otherwise configure the operating mode of the camera. The camera 100 can also include a microphone 112 configured to receive and record audio signals in conjunction with recording video. The side of the camera 100 may include an I/O interface 114.

As illustrated, the camera 100 may include a lens 104 configured to receive light incident upon the lens and to direct received light onto an image sensor internal to the lens. The lens 104 might be enclosed by a lens ring 116, which are both part of the integrated image sensor and lens assembly discussed below.

Integrated Image Sensor Assembly and Camera Lens System

An integrated image sensor and lens assembly may comprise a lens barrel holding a set of camera lens elements coupled to a lens mount. The lens mount is further coupled to an image sensor substrate that has an image sensor lying on an image plane. The optical distance between the set of lenses and the image sensor is tuned such that the focal plane of the lenses coincides with the image plane. Due to thermal expansion of the lens barrel and the lens mount, the optical distance between the lens elements and the image sensor may vary and cause the focal plane of the set of lenses to shift away from the image plane causing the images captured by the image sensor to be out of focus. However, even with a camera designed to compensate for the lens barrel changing optical distances, mitigating thermal gradients around the lens elements is desirable.

Figure 2:
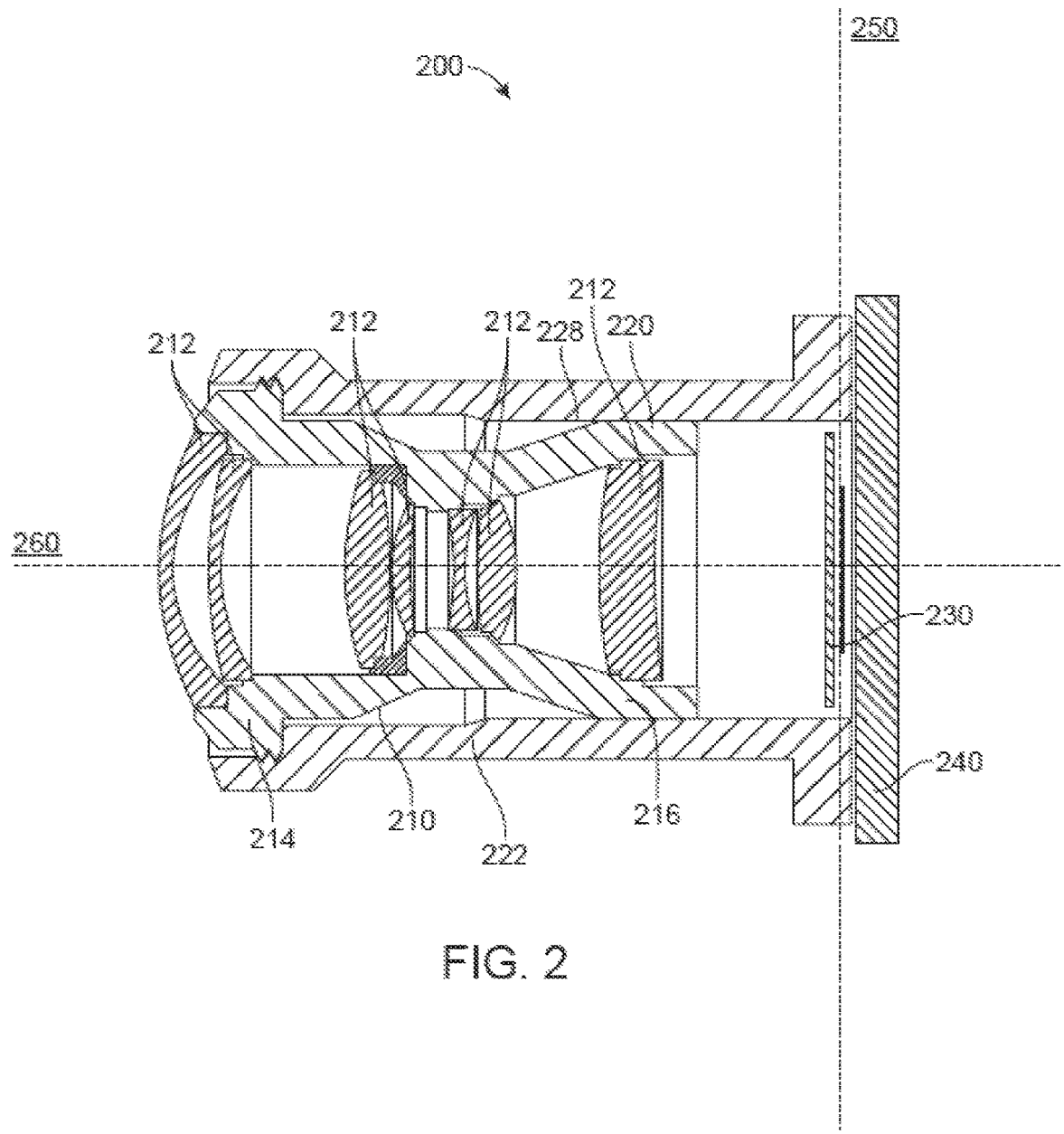
FIG. 2 illustrates a cross-sectional view of an embodiment of an integrated image sensor and lens assembly.

FIG. 2 illustrates a cross-sectional view of an embodiment of an integrated image sensor substrate and camera lens system configuration 200 that may include a camera lens barrel 210, a camera lens mount 220, and an image sensor substrate 230. The image sensor substrate 230 may have an image sensor assembly 240 for capturing images and/or video. The camera lens mount 220 may be physically affixed to the image sensor substrate 230 and also affixed to the camera lens barrel 210.

The lens barrel 210 may comprise one or more lens elements or other lens elements 212 to direct light to the image sensor assembly 230. The lens barrel 210 might be affixed to the lens mount 220 with a threaded joint at the end of the barrel arms 214 positioned to minimize the thermal shift of the focal plane relative to the image plane 250. The lens barrel 210 may comprise a lower portion 216, one or more barrel arms 214, and a lens window (which may be one of the lens elements 212). The lower portion 216 of the lens barrel 210 can be substantially cylindrical and structured to at least partially extend into the channel of the lens tube 222 portion of the camera lens mount 220. The barrel arms 214 may extend radially from the body of the lens barrel 210 and may be outside the channel of the lens mount 220 when assembled. The lens arms 214 may be used to physically couple the lens barrel 210 to the camera body 102 (not shown). The lens window might include optical components to enable external light to enter the lens barrel 210 and be directed to the image sensor assembly 240. The camera lens mount 220 may include a tube portion 222 that extends away from the image sensor assembly along the optical axis 260 and may include a substantially cylindrical channel for receiving the lens barrel 210. The back portion of the lens barrel 216 can be used for axial alignment relative to the lens mount 220.

The image sensor substrate 230 may comprise a printed circuit board for mounting the image sensor assembly 240 and may furthermore include various electronic components that operate with the image sensor assembly 240 or provide external connections to other components of the camera system. The image sensor assembly 240 might house an image sensor (e.g., a high-definition image sensor) for capturing images and/or video and may include structural elements for physically coupling the image sensor assembly 240 to the image sensor substrate 230 and to the camera lens mount 220. The image sensor of the image sensor assembly 240 might lie on an image plane 250. The combined focal plane of the lens elements 212 including the lens window and lens elements inside barrel 216 may be maintained to coincide with the image plane 250.

The lens barrel 210 may be made of a material having a coefficient of thermal expansion that causes the lens barrel 210 to expand with increasing temperature. As a result of this expansion, the lens elements 212 may move further apart from each other with increasing temperature. Absent compensation, the increased distances between the lens elements 212 can cause a shift in the position of the focal plane 250 such that the image is no longer focused at the image sensor assembly 240.

Internal Camera Components

Figure 3A:
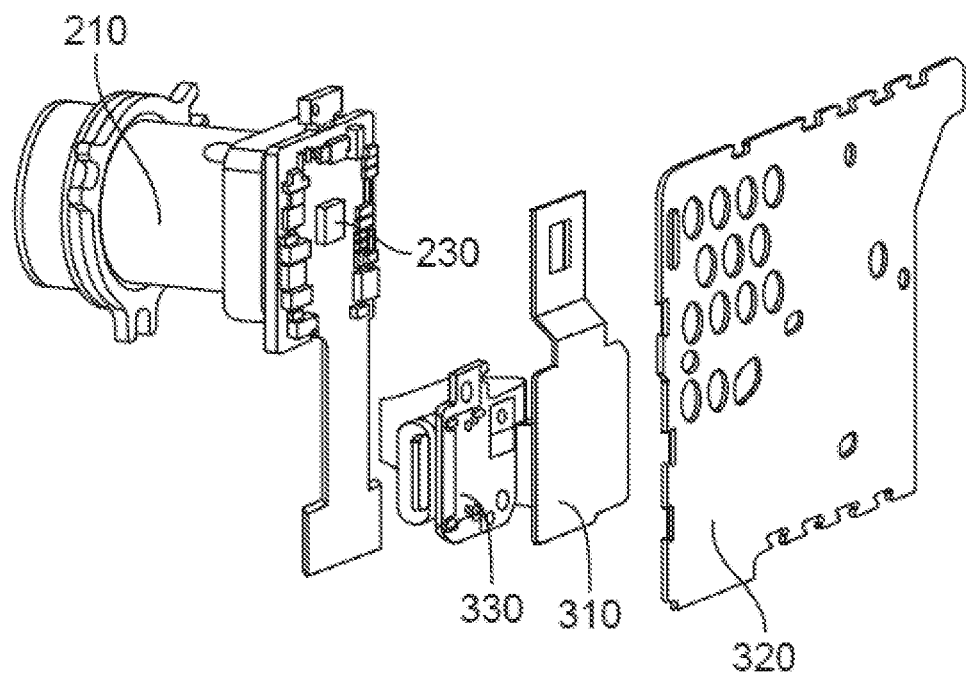
FIG. 3A illustrates an isometric exploded view of components inside the camera body, according to one embodiment.
Figure 3B:
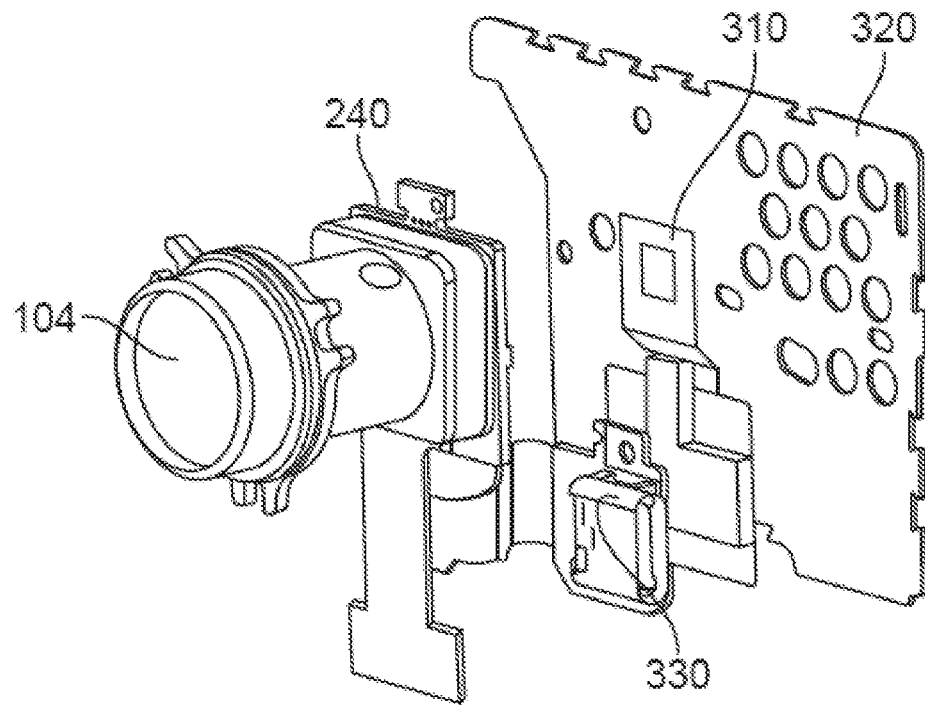
FIG. 3B illustrates an alternate isometric exploded view of components inside the camera body, according to one embodiment.
Figure 3C:
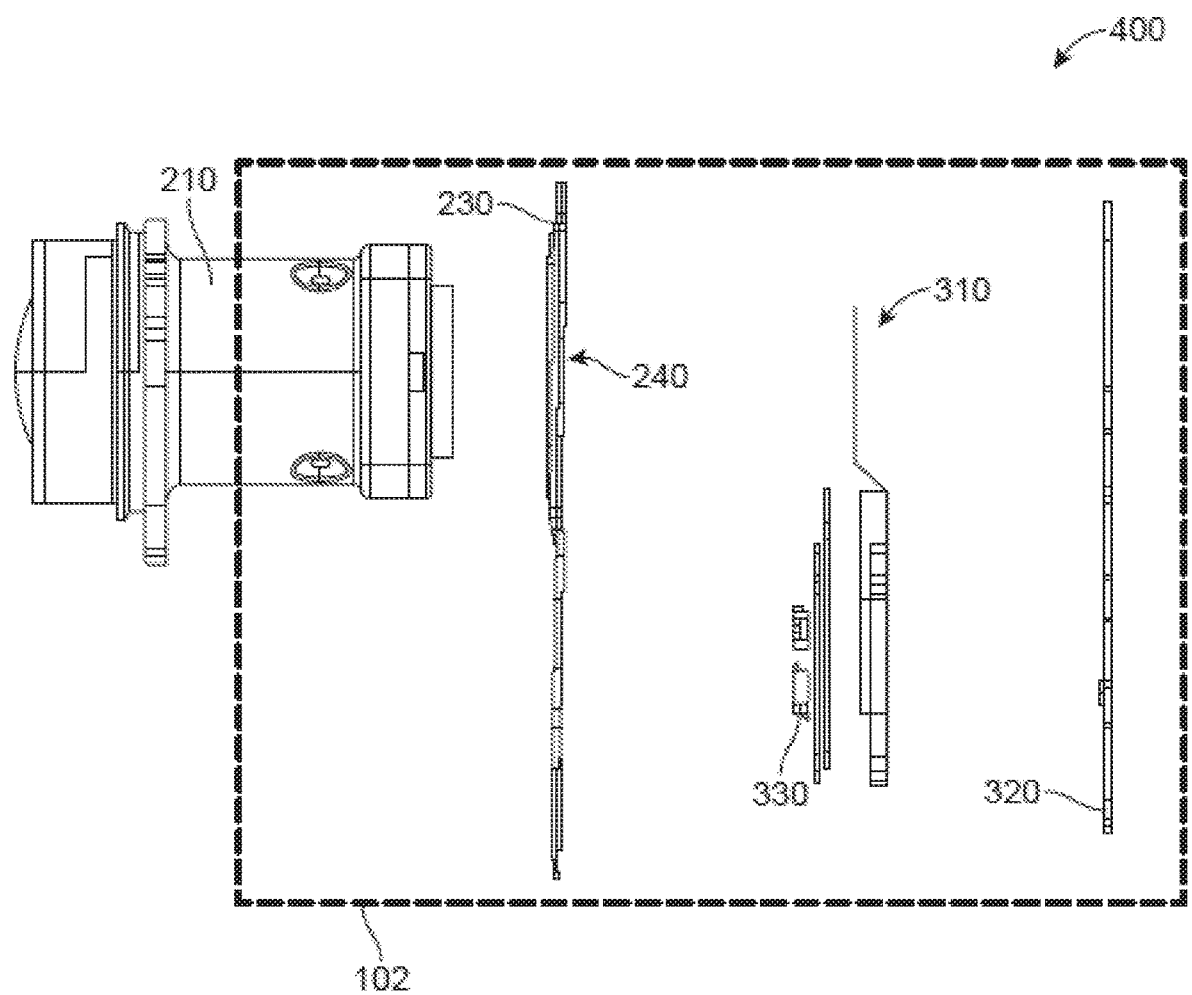
FIG. 3C illustrates an exploded cross sectional view of components inside a camera body, according to one embodiment.
Figure 4A:
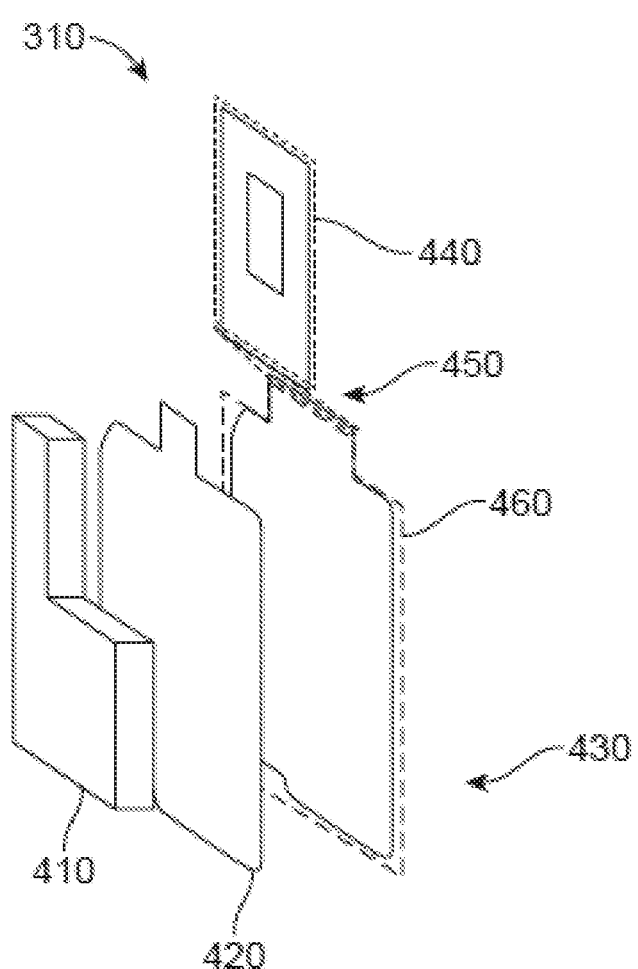
FIG. 4A illustrates an exploded isometric view of the heat controller, according to one embodiment.
Figure 4B:
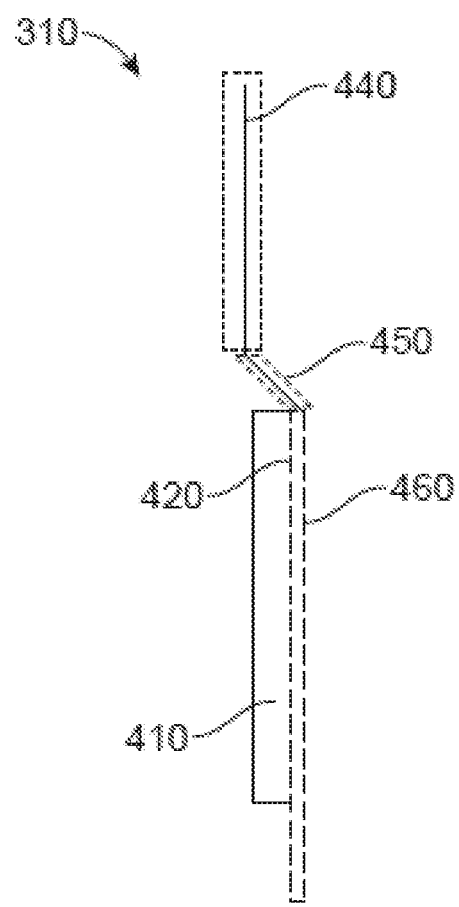
FIG. 4B illustrates cross sectional view of the heat controller, according to one embodiment.

FIGS. 3A-3C illustrate internal views of an embodiment of a camera 100 comprising a heat controller 310, a heat diffuser 320, an auxiliary electronics assembly 330, the lens barrel 210, the image sensor substrate 230, the image sensor assembly 240, and the camera lens 104.

FIGS. 3A and 3B demonstrate exploded isometric views of an embodiment in which the heat controller may spread thermal energy away from the image sensor assembly. Light from outside the camera housing may enter the camera lens 104 coupled to the front facing surface of the lens barrel 210 and focus onto the image sensor assembly 240. Resistive heating created by the electronic processing of images/videos with the image sensor assembly 240 can produce thermal energy. The thermal energy may be passively removed from the image sensor assembly 240 by the heat controller 310 and thermodynamically moved towards the heat diffuser 320 for dissipation to an external surface of the camera. The auxiliary electronics assembly 330 can be thermally isolated from the heat controller 310 to prevent excess thermal energy from transferring towards the integrated lens barrel 210 and image sensor assembly 240.

FIG. 3C shows a cross-sectional exploded internal view of an embodiment of the camera 100. The lens barrel 210 can have a front side and a back side. The front side may face the same direction as an external front facing surface of the camera (e.g., facing left in the orientation of FIG. 3C) and the back side may face an internal rear surface of the camera (e.g., facing right in the orientation of FIG. 3C). The lens barrel can pass through the camera body 102 on a front facing surface of the camera and the back side may couple to the image sensor substrate 230. The image sensor substrate 230 can have a front side facing an internal front surface of the camera body 102 (e.g., facing left in the orientation of FIG. 3C) and a back side facing an internal rear surface of the camera body (e.g., facing right in the orientation of FIG. 3C). The lens barrel 210 may couple to the front side of the image sensor substrate 230. For example, in one embodiment, a thermally conductive adhesive may be used. The image sensor assembly 240 may mount in the center of the back side of the image sensor substrate 230 such that the image sensor assembly 230 can detect light focused by the lens elements 212 on or near the image plane 250.

The heat controller 310, further described in detail below, may have front side facing an internal front side of the camera body 102 and a back side facing an internal back side of the camera body 102. The heat controller 310 may thermally couple to the back side of the image sensor substrate 230. In one embodiment, the heat controller 310 may couple to the image sensor substrate 230 with thermally conductive adhesive allowing heat transfer from the image sensor substrate 230 to the heat controller 310. Additionally, the heat controller 310 may be constructed such that it couples to the image sensor substrate 230 with the heat controller 310 at least partially surrounding the image sensor assembly 240. In another embodiment, a set of auxiliary electronics 320 may thermally couple to the front side of the heat controller 310 and a heat diffuser 320 may thermally coupled to the back side of the heat controller 310.

Auxiliary Electronics Assembly

The auxiliary electronics assembly 330 may comprise a front side facing an inner front surface of the camera body 116 and a back side facing an inner rear surface of the camera body 116. The auxiliary electronics assembly 330 can be positioned below the lens assembly, near the inner bottom surface of the camera body 116 and with the front face in close proximity to the inner front surface of the camera body 116 and the rear face coupled to the heat controller 310.

The auxiliary electronics assembly 330 may be mounted on a substrate comprising a printed circuit board for mounting auxiliary electronics. The auxiliary electronics may comprise various electronic components that may operate with the image sensor assembly or provide external connections to other components of the camera or external electronic devices. The components may include input/output electronics for communicating with external control or storage devices, radio frequency transmitters and receivers for wirelessly communicating with external control or storage devices, processing electronics for interpreting and encoding signals, power management electronics for powering onboard components, or similar.

The auxiliary electronics assembly 330 can increase in temperature during use as a portion of the electrical energy used to operate the electronic components is converted to thermal energy by resistive heating. The auxiliary electronics assembly can thermally couple to the heat controller 310 by direct contact caused by compressive forces between any combination of the front surface of the camera body 102, the auxiliary electronics assembly 330, and the heat controller 310 created during the camera assembly process. In one embodiment, the auxiliary electronics assembly 330 may be thermally isolated from the heat controller 310.

In one embodiment, the auxiliary electronics assembly 330 may thermally couple an external surface on the camera body 102. The external surface on the camera body 116 may act as a heat sink, transferring heat produced by the internal auxiliary electronics assembly 320 to the exterior surface of the camera body 102 where it dissipated into the surrounding air, reducing the overall heat transfer towards the image sensor assembly 240.

Heat Diffuser

The heat diffuser 320 may comprise a front side facing an inner front surface of the camera body 116 and a back side facing an inner rear surface of the camera body 116. The back side of the heat diffuser may be thermally coupled to the inner rear surface of the camera body. The heat diffuser 320 is similarly sized to the inner rear surface of the camera body 116 such that the edges of the heat diffuser 320 may be used to couple the heat diffuser to the camera body 116 near the edges of the camera body 116 during assembly. The front side of the heat diffuser 320 may be thermally coupled to the back side of the heat controller 310. The heat diffuser 320 can be thermally coupled to the heat controller 310 by direct contact caused by compressive forces between any combination of the front surface of the camera body, the rear surface of the camera body, the auxiliary electronics assembly 330, and the heat controller 310 created during the camera assembly process. In some embodiments, the heat diffuser 320 and the heat diffuser 320 may not be rigidly coupled by an adhesive, screw, or other fastener, simplifying assembly of the camera 100.

The surface area of the heat diffuser 320 can be larger than the surface area of the heat controller 310. The larger surface area of the heat diffuser 320 further encourages spreading heat from the image sensor assembly 240 away from the camera lens system 200. The heat diffuser 320 may further comprise a material with a high thermal conductivity allowing heat produced by image sensor assembly 240 to be easily transferred through the heat controller 310 to the heat diffuser 320 to move thermal energy away from the camera lens system 200 for dissipation.

In one embodiment, the heat diffuser 320 may be thermally coupled to an external surface on the camera body 116. The external surface on the camera body 116 may act as a heat sink, transferring heat produced by the internal auxiliary electronics assembly 320 to the exterior surface of the camera body 116 where the heat is dissipated into the surrounding air, reducing the overall thermal energy near the image sensor assembly 240.

Heat Controller

The heat controller is designed to move thermal energy away from the image sensor assembly and the lens assembly to prevent thermal heating of the lens elements within the lens assembly. Heating of the lens elements results in a change of the focal plane away from the image plane of the image sensor assembly causing out of focus images. In traditional thermal management systems, a heat spreader consists of a heat source and a heat exchange with the heat source and the heat exchange thermally coupled and having a thermal gradient between the two. The system moves heat from the heat source to the heat exchange whose surface area and geometry are more favorable for heat dissipation than the heat source. In some systems the heat exchange is spatially removed from the heat source to allow for thermal management in specialized working environments.

Figure 5A:
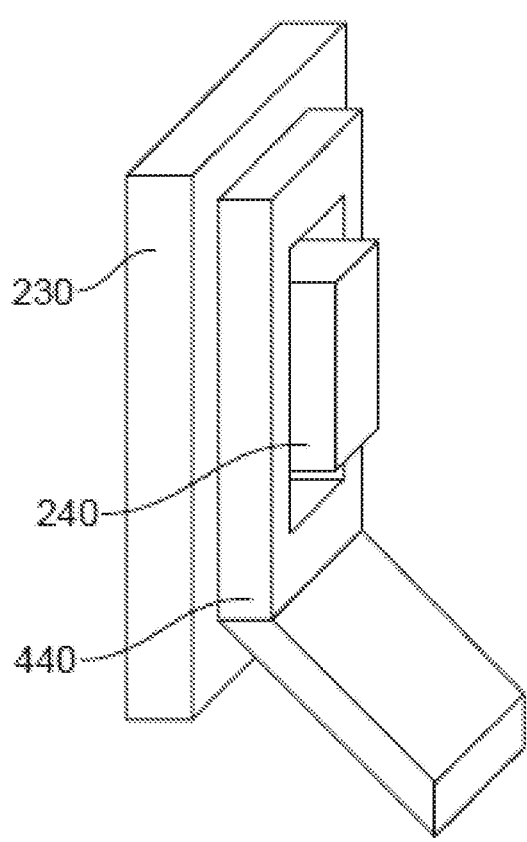
FIG. 5A illustrates the heat source coupled to the image sensor substrate, according to one embodiment.
Figure 5B:
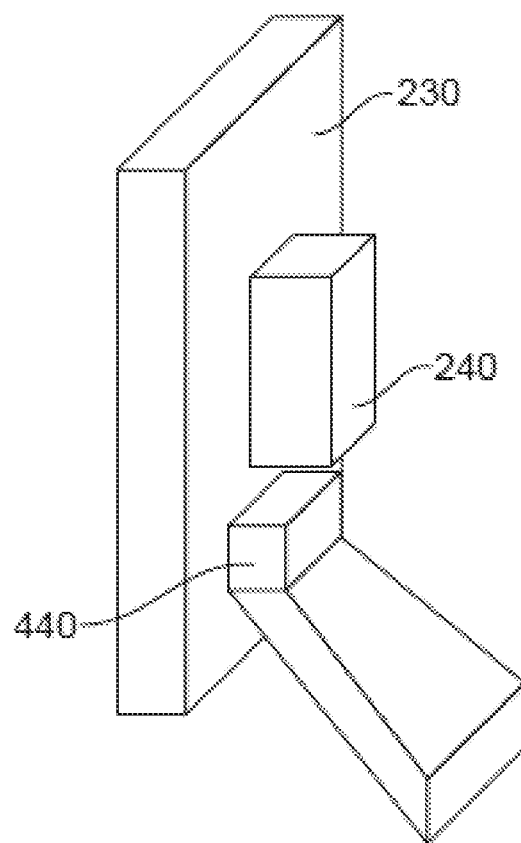
FIG. 5B illustrates the heat source coupled to the image sensor substrate, according to a separate embodiment.

FIGS. 5A and 5B illustrate an example isometric exploded and cross sectional views of the heat controller 310. The heat controller 310 may comprise three portions: a compressible spacer 410, a mechanical stabilizer 420, and a heat spreader 430, the heat spreader including a heat source 440, an offset arm 450, and a heat exchange 460. In this example, the back of the compressible spacer 410 may couple to the front of the mechanical stabilizer 420 and the back of the mechanical stabilizer 420 may couple to the front of the heat spreader 430. The three portions operate together to passively manage the movement of heat generated by electronics internal to the camera body; specifically, they can move heat away from the image sensor assembly 240 and lens barrel 210 towards external heat sinks and can prevent heat generated from other internal camera components transferring towards the image sensor assembly 240 and lens barrel 210.

Compressible Spacer

The compressible spacer 410 may have a front side and a back side, the front side facing an internal front surface of the camera body, and the back side facing an internal rear surface of the camera body. The back side of the compressible 510 spacer may be thermally coupled to the mechanical spacer by a pressure sensitive adhesive (PSA). The PSA may be placed at the interface between the back side of compressible spacer 410 and the front side of the mechanical stabilizer 420 and forms a bond between the two when pressure may be applied to the interface during assembly of the camera system. The surface area of the back side of the compressible spacer 410 might be less than the surface area of the front side of the mechanical stabilizer 420 such that the entirety of the back side of the compressible spacer 410 may be within the edges of the front side of the mechanical stabilizer 420 when bonded together by the PSA.

The front side of the compressible 510 spacer may be thermally coupled to other camera components internal to the camera body. In one example, the auxiliary electronics assembly 320 may thermally couple to the front side and the heat spreader may thermally couple to the back side of the compressible spacer. The surface area of the front side of the compressible spacer 410 may be greater than the surface area of the back side of the auxiliary electronics assembly 320 such that the entirety of the back side of the auxiliary electronics assembly 320 may be within the edges of the front side of the compressible spacer 410 when coupled together. The smaller relative surface area of the auxiliary electronics assembly 320 that may be encompassed by the surface area of the compressible spacer 410 can further prevent thermal transfer from the auxiliary electronics assembly 320 towards the image sensor assembly 240 by ensuring that there may be no interface or direct thermal coupling between the auxiliary electronics assembly and the heat spreader.

In some embodiments the compressible spacer 410 can be a conductive foam with a thermal conductivity of 0.04-0.08 W/mK. With this thermal conductivity, the compressible spacer 410 may prevent heat transfer between camera components thermally coupled to the front side to camera components thermally coupled to the back side of the compressible spacer. The camera components thermally coupled to the front side of the compressible spacer may be the auxiliary electronics assembly.

Mechanical Stabilizer

The mechanical stabilizer 420 may have a front side and a back side, the front side facing an internal front surface of the camera body and the back side facing an internal rear surface of the camera body. The front side of the mechanical spacer 520 may be thermally coupled to the compressible spacer 410, and the back side of the mechanical spacer 520 may be thermally coupled to the heat controller 310 by a PSA. The PSA can be placed at the interface between the back side of mechanical spacer 520 and the front side of the heat controller 310 and can form a bond between the two when pressure is applied to the interface during assembly of the camera system. The surface area of the back side of the mechanical stabilizer 420 may be less than the surface area of the front side of the heat controller 310 such that the entirety of the back side of the mechanical stabilizer 420 may be within the edges of the front side of the heat controller 310 when bonded together by the PSA.

The mechanical stabilizer 420 can be constructed of a material with mechanical stiffness sufficient to assist in preventing deformation of the heat controller 310. The mechanical stabilizer 420 may be coupled to specific regions of the heat controller 310 such that the regions of the heat controller 310 coupled to the mechanical stabilizer 420 resist deformation from compressive forces created during camera assembly. In one example, the mechanical stabilizer 420 might be a stainless steel piece approximately 0.15 mm thick with an approximate thermal conductivity of 15 W/mK.

The front side of the heat controller 310 may be thermally coupled to the mechanical stabilizer 420, and the back side of the heat controller 310 may be thermally coupled to the heat diffuser 320. The surface area of the back side of the heat controller 310 may be less than the surface area of the front side of the heat diffuser 320 such that the entirety of the back side of the heat controller 310 may be within the edges of the front side of the heat diffuser 320 when coupled together. The heat controller 310 may be thermally coupled to the heat diffuser 320 by direct contact caused by compressive forces between any combination of the inner rear surface of the camera body 102, the heat diffuser 320, the heat controller 310, and the mechanical stabilizer 420 created during the camera assembly process.

Heat Spreader

The heat spreader may consist of three subsections illustrated in FIGS. 5A and 5B: a heat source 440, an offset arm 450, and a heat exchange 460. Broadly, the heat spreader 310 can passively extract thermal energy produced by the image sensor assembly 240 into the heat source 440, where the heat can travel through the offset arm 450 to the heat exchange 460 and towards the heat diffuser 320 for dissipation via an external heat sink.

The heat source 440 may have a front side, a back side, and a bottom side, the front side facing an internal front surface of the camera body, the back side facing an internal rear surface of the camera body, and the bottom side facing an internal bottom surface of the camera body. The front side of the heat source 440 may be thermally coupled to the image sensor assembly 240 with a thermally conductive adhesive. The heat exchange 460 might move thermal energy to the heat diffuser 320 after receiving heat from the heat source 440 that was transferred through the offset arm 450. The heat exchange 460 may have a front side facing an inner front surface of the camera body and a back side facing an inner rear surface of the camera body. The front side of the heat exchange 460 may be thermally coupled to the mechanical stabilizer 420, and the back side of the heat exchange may be thermally coupled to the heat diffuser 320.

The offset arm 450 may transfer heat from the heat source 440 thermally coupled to the image sensor assembly to the heat exchange 460. The offset arm 450 can have a top side, a bottom side, a front side and a back side. The top side of the offset arm can be facing an internal top surface of the camera body, and the bottom side may be facing an internal bottom surface of the camera body. The top side of the offset arm 450 may couple to the bottom side of the heat source 440 and the bottom side of the offset arm 450 may couple to the top side of the heat exchange 460. The bottom side of the heat source 440 and the top side of the offset arm 450 may be the same length and the bottom side of the offset arm 450 can be shorter in length than the top side of the heat exchange 460.

The front side of the heat exchange 460 may be thermally coupled to the back side of the mechanical stabilizer 420 by a PSA. The PSA can be placed at the interface between the back side of mechanical stabilizer 420 and the front side of the heat exchange 310 and forms a bond between the two when pressure is applied to the interface during assembly of the camera system. The surface area of the back side of the heat exchange 310 can be less than the surface area of the front side of the heat diffuser 320 such that the entirety of the back side of the heat exchange 460 may be within the edges of the front side of the heat diffuser 320 when coupled together. The heat exchange 460 may be thermally coupled to the heat diffuser by direct contact caused by compressive forces between any combination of the camera body 102, the heat diffuser 320, the heat controller 310, and the mechanical stabilizer 420 created during the camera assembly process. In an alternative embodiment, the heat exchange 460 may be thermally coupled to the heat diffuser 320 via thermally conductive adhesive.

The surface area of the front side of the heat exchange 460 can be greater than the surface area of the back side of the mechanical stabilizer 420 such that the entirety of the back side of the mechanical stabilizer 420 may be within the edges of the front side of the heat exchange 460 when coupled together. The mechanical stabilizer 420 may be coupled to specific regions of the heat exchange 460 such that the regions of the heat exchange 460 coupled to the mechanical stabilizer 420 resist deformation from compressive forces created during camera assembly.

Alternative Embodiments

In one embodiment, all subsections of the heat controller 310 may be a singular piece and fabricated from the same material. As an example, the heat controller 310 may be a piece of graphite approximately 0.1 mm thick. The thickness and mechanical stiffness of the graphite can allow for deformation of the heat controller 310 when not coupled to materials with a mechanical stiffness sufficient to aid in preventing deformation when exposed to compressive forces during assembly. In this embodiment, the heat exchange 460 may couple to the mechanical stiffener and the heat source 440 may couple to the image sensor substrate such that the graphite in those areas may prevent deformation. As the offset arm 450 is not coupled to a material with a mechanical stiffness to prevent deformation, it can deform when the heat controller 310 is exposed to compressive forces during assembly.

Additionally, the graphite may have a lateral thermal conductivity between 600-1000 W/mK and an out of plane conductivity between 5-20 W/mK. A lateral thermal conductivity relatively higher than the out of plane conductivity can encourage movement of thermal energy from the heat source 440 to the heat exchange 460 and can discourage movement of thermal energy from the auxiliary electronics assembly to the heat diffuser.

In an alternative embodiment, the heat source 440, the offset arm 450, and the heat exchange 460 can be fabricated with different materials to allow for further engineering of the thermal management in the heat controller 310.

In some configurations, as in the example illustrated by FIG. 5A, the front side of the heat source 440 may have a surface similar in size to the image sensor substrate 230 with a center portion of the surface removed similar in size to the image sensor assembly 240. This example allows the front side of the heat source 440 to at least partially surround the image sensor assembly for the extraction of thermal energy when thermally coupled to the image sensor substrate 230. In some configurations, as illustrated by FIG. 5B, the front side of the heat source 440 can have a surface area smaller than the image sensor substrate 230 and image sensor assembly 240 such that the heat source 440 may thermally couple to image sensor substrate 230 in an area adjacent to the image sensor assembly 240 to extract thermal energy.

Compressive States

Figure 6A:
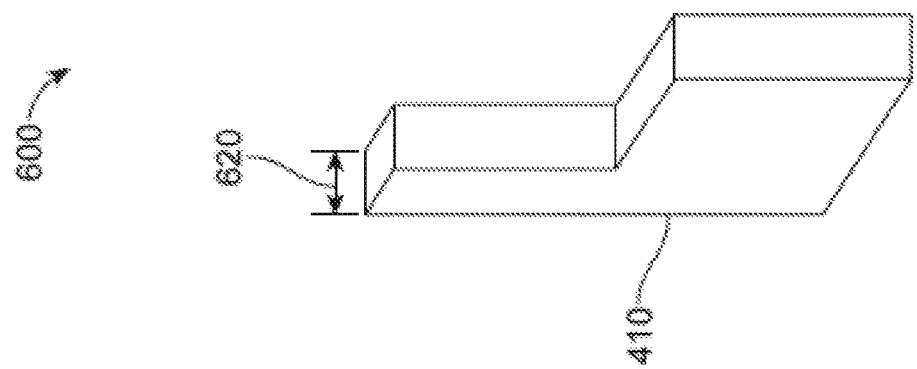
FIG. 6A illustrates the compressible spacer, according to one embodiment.
Figure 6B:
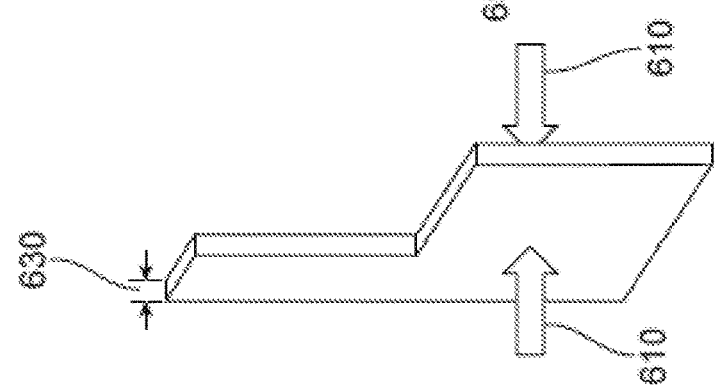
FIG. 6B illustrates the compressible spacer under compressive force, according to one embodiment.
Figure 6C:
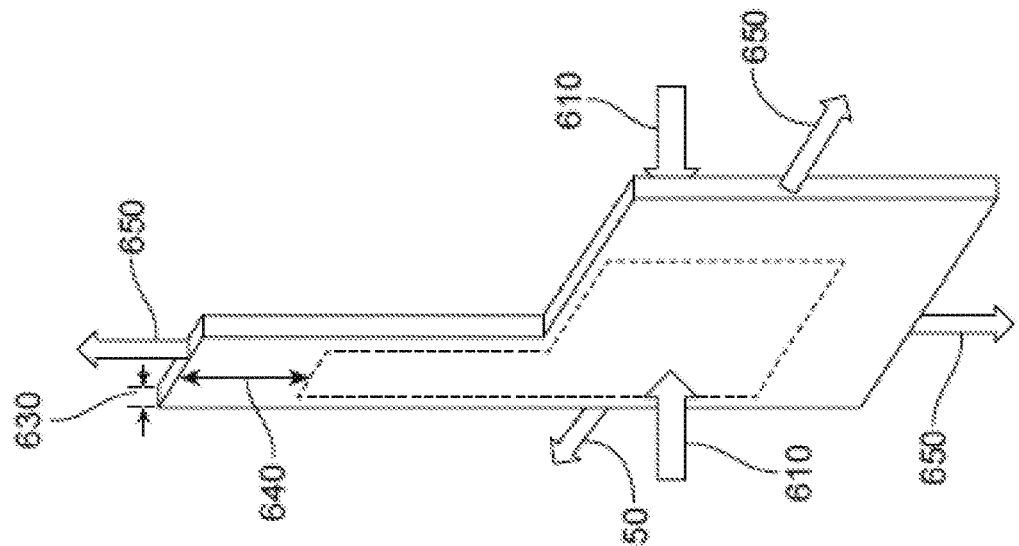
FIG. 6C illustrates the compressible spacer under compressive force, according to a different embodiment.

The compressible spacer 410 might be constructed of a material with a mechanical stiffness that allows deformation of the compressible spacer 410 structure. In one example, illustrated by FIGS. 6A and 6B, the deformation of the compressible spacer 410 may originate from a compressive force 610 between camera components internal to the camera body coupled to the front side and the back side of the compressible spacer 410. Before assembly, the compressible spacer may have an original distance between the front side and the back side 620, approximately two millimeters in this example. During assembly, the compressive force 610 can cause the compressible spacer to reduce in volume; i.e., the distance between the front side and the back side 630 can reduce as a result of the compressive force. In an alternative example illustrated by FIGS. 6A and 6C, the compressive force 610 between the front side and back side might reduce the distance between the front and back side of the compressible spacer 630 while simultaneously expanding the surface area of the compressible spacer 640; i.e. the volume of the compressible spacer 410 can be maintained, reducing the dimension of the compressible spacer between the front side and back side may simultaneously expand at least one other dimension 650 of the compressible spacer 410.

Figure 7A:
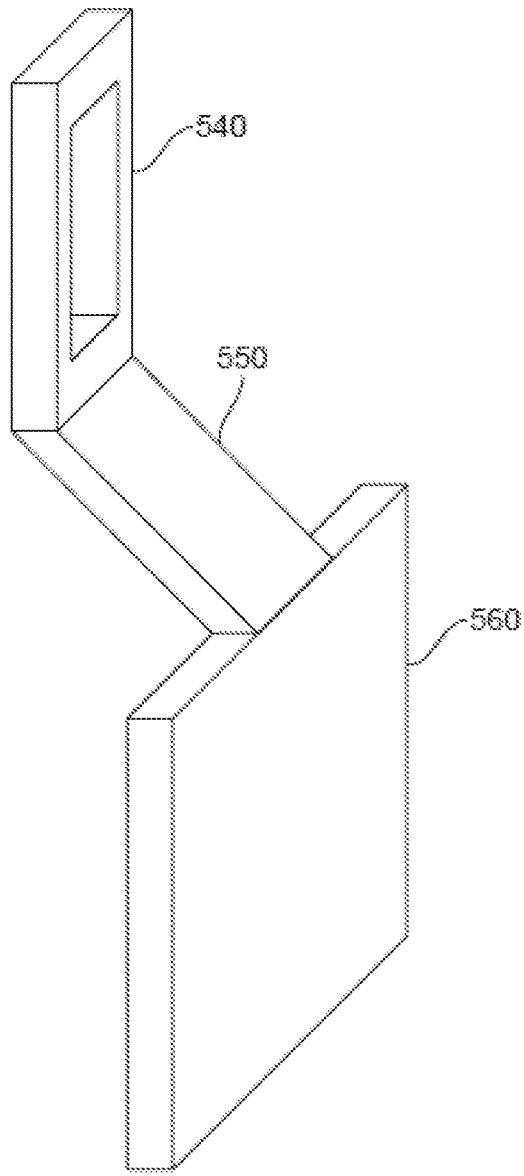
FIG. 7A illustrates the heat spreader without compressive force, according to one embodiment.
Figure 7B:
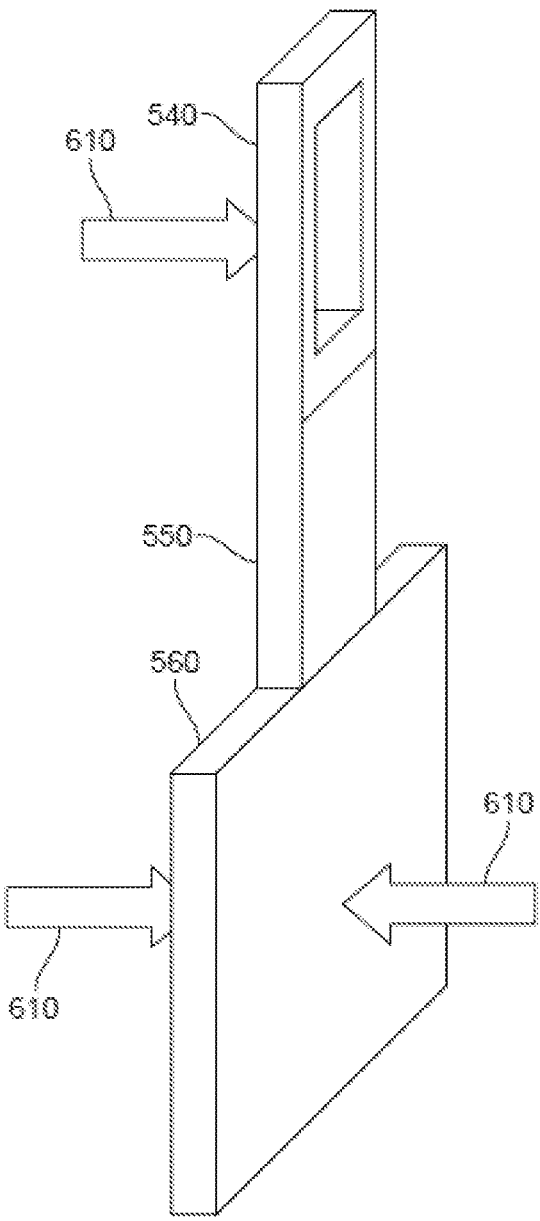
FIG. 7B illustrates the heat spreader with compressive force, according to one embodiment.

FIGS. 7A and 7B illustrate the offset arm 450 in a decompressed and fully compressed state. The offset arm can be mechanically flexible and may be constructed of a material that allows material deformation of the arm when compressive forces are exerted on the heat controller 310. Significantly, the offset arm 450 may not thermally couple to the mechanical stabilizer 420. FIG. 7A illustrates an example the offset arm 450 in a decompressed state in which there are no compressive forces acting on the heat controller 310. When there are no compressive forces acting on the heat controller 310, the back side of the offset arm 450 may face a combination of the inner rear surface and inner top surface of the camera body and the back side may face a combination of the inner bottom surface and inner front surface of the camera body. The front side of the offset arm 450 and the front side of the heat exchange 460 (and, similarly, the back sides) may couple at an angle such that the heat source 440 may couple to the opposite end of the offset arm 450 nearer the inner front surface of the camera body than the heat exchange 460.

FIG. 7B illustrates an example of offset arm 450 in a fully compressed state in which there are compressive forces 610 acting on the heat controller 310. When in a fully compressed state the offset arm 450 may have a back side and a front side, the back side facing the inner rear surface of the camera body and the front side facing the inner front surface of the camera body. While fully compressed, the front side of the offset arm 450 and the front side of the heat exchange 460 (and, similarly, the back sides) may couple such that the heat source 440 coupled to the opposite end of the offset arm 450 can be in the same plane as the heat source 440 and the heat exchange 460. In this configuration the front side and the back side of the heat source 440, the offset arm 450, and the heat exchange 460 may be substantially flush. As compressive forces are applied to the heat controller 310 during assembly, the offset arm 450 moves from the decompressed state to the fully compressed state. In many embodiments, the heat controller 310 may not achieve a fully compressed state even when the camera 100 is fully assembled, with the offset arm 450 being in a state between decompressed and fully compressed.

Interfaces

Figure 8:
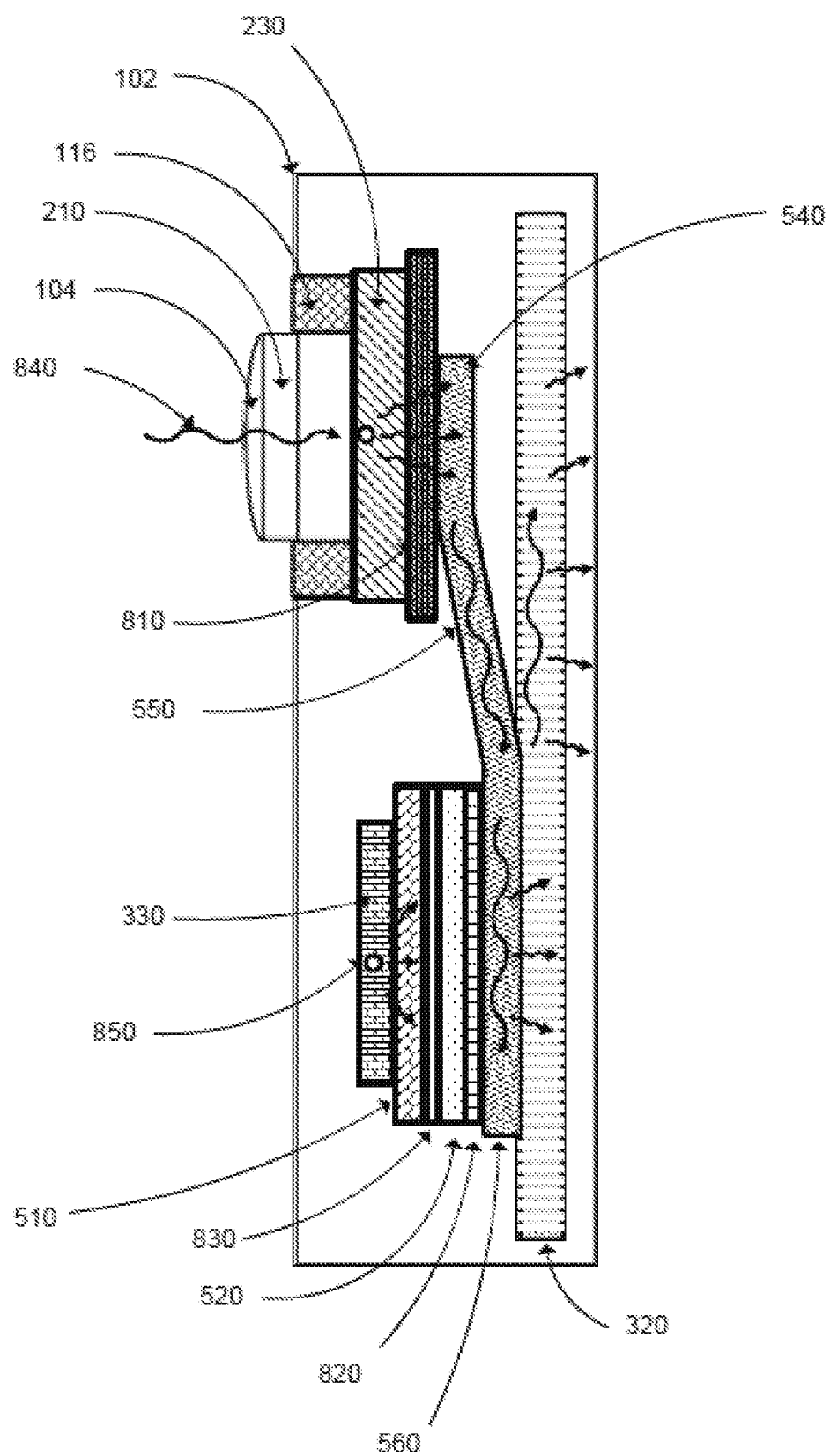
FIG. 8 illustrates a cross-sectional view of the camera with thermal interfaces and heat flow, according to one embodiment.

FIG. 8 illustrates an embodiment of the camera with all camera components, interfaces shown and demonstrates the thermal transport throughout the camera. The front facing lens may be on an external front facing surface of the camera 100. The lens barrel 210 and lens ring can pass through the front surface of the camera body 102 and may mount to the front side of image sensor substrate 230. On the back side of the image sensor substrate 230, the heat source may thermally couple to the image sensor substrate 230 with thermally conductive adhesive 810. The heat source 440 may thermally couple to the heat exchange via the offset arm 450. The back side of the heat exchange 460 may thermally couple to the heat diffuser 320. The mechanical stabilizer 420 may thermally couple to the front side of the heat exchange 460 by a pressure sensitive adhesive 820. The compressible spacer 410 may thermally couple to the front side of the mechanical stabilizer 420 by a pressure sensitive adhesive 830. The auxiliary electronics assembly 330 may couple to front side of the compressible spacer 410.

Light from the external environment 840 may enter the lens and focus onto the image sensor assembly where the image processing electronics produce thermal energy via resistive heating. The heat can be transferred from the image sensor substrate 230 to the heat source 440 via a thermally conductive adhesive 810 and may be transferred through the offset arm 450 to the heat exchange 460 due to the high lateral conductivity of the heat source, offset arm, and heat exchange. The heat may transfer into the heat diffuser 320 for dissipation away from the lens assembly. The auxiliary electronics assembly 330 may produce heat through resistive heating processes 850. The thermal energy can be transferred into the compressible spacer 410, but the low thermal conductivity of the compressible spacer 410 can prevent thermal energy from reaching the heat exchange 460 via the mechanical stabilizer 420.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a heat spreader as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera, comprising:
    a camera body having a lens window on a front outer surface of the camera body;
    a lens assembly coupled to the lens window and internal to the camera body, the lens assembly comprising one or more lens elements internal to a lens barrel, the one or more lens elements for focusing light entering the lens window onto an image sensor;
    an image sensor assembly internal to the camera body coupled to the lens assembly and comprising a front side facing an inner front surface of the camera body and a back side facing an inner rear surface of the camera body, the image sensor assembly comprising the image sensor, the image sensor assembly to detect and capture images from the light focused via the lens assembly;
    a thermally conductive rear heat diffuser covering at least a portion of the inner rear surface of the camera body;
    a thermally conductive heat spreader comprising a heat source, a mechanically flexible offset arm, and a heat exchange, the heat source thermally coupled to the image sensor, the heat exchange thermally coupled to the thermally conductive rear heat diffuser, and the flexible offset arm flexibly coupling the heat source and the thermally conductive rear heat diffuser, the thermally conductive heat spreader to transfer heat produced by the image sensor assembly away from the image sensor assembly to the thermally conductive rear heat diffuser;
    a mechanical stabilizer coupled to a front side of the heat exchange facing the inner front surface of the camera body, the mechanical stabilizer to provide structural stability to the heat exchange;
    an auxiliary electronics assembly internal the camera body;
    a compressible spacer between the mechanical stabilizer and the auxiliary electronics assembly, the auxiliary electronics assembly compressed against the compressible spacer within the camera body and causing a back side of the heat exchange to be in contact with the thermally conductive rear heat diffuser, the compressible spacer thermally insulating the auxiliary electronics assembly from the heat spreader.

2. The camera of claim 1, wherein the thermally conductive rear heat diffuser is thermally coupled to the heat spreader by direct contact induced when compression between the auxiliary electronics, the compressible spacer, and the thermally conductive rear heat diffuser causes a flexion of the flexible offset arm.

3. The camera of claim 1, wherein the heat source is coupled to the image sensor assembly via thermally conductive adhesive.

4. The camera of claim 1, wherein the heat source at least partially surrounds the image sensor.

5. The camera of claim 1, wherein the thermally conductive rear heat spreader comprises a first material with a higher in plane conductivity than out of plane thermal conductivity.

6. The camera of claim 1, further comprising a thermally conductive heat sink, the heat sink comprising a thermally conductive surface positioned on an external surface of the camera body.

7. The camera of claim 6, wherein the thermally conductive heat sink is thermally coupled to the thermally conductive rear heat diffuser, the heat sink dissipating the heat produced by the image sensor assembly to an exterior of the camera body.

8. A camera, comprising:
a camera body having a lens window on a front outer surface of the camera body;
a lens assembly coupled to the lens window and internal to the camera body, the lens assembly comprising one or more lens elements internal to a lens barrel, the one or more lens elements for focusing light entering the lens window onto an image sensor;
an image sensor assembly internal to the camera body coupled to the lens assembly and comprising a front side facing an inner front surface of the camera body and a back side facing an inner rear surface of the camera body, the image sensor assembly comprising the image sensor, the image sensor assembly to detect and capture images from the light focused via the lens assembly;
a thermally conductive rear heat diffuser covering at least a portion of the inner rear surface of the camera body;
a thermally conductive heat spreader thermally coupled to the image sensor, the thermally conductive heat spreader to transfer heat produced by the image sensor assembly away from the image sensor assembly to the thermally conductive rear heat diffuser;
a mechanical stabilizer coupled to the heat spreader; and
a compressible spacer coupled to the mechanical stabilizer.

9. The camera of claim 8, wherein the heat spreader comprises a heat source thermally coupled to the image sensor for transferring heat away from the image sensor, a mechanically flexible offset arm and a heat exchange, the heat exchange thermally coupled to the thermally conductive rear heat diffuser, and the flexible offset arm flexibly coupling the heat source and the heat exchange, wherein the thermally conductive rear heat diffuser is thermally coupled to the heat exchange by direct contact induced when compression between the camera body and the heat diffuser causes a flexion of the flexible offset arm.

10. The camera of claim 9, further comprising a thermally conductive heat sink, the heat sink comprising a thermally conductive surface positioned on an external surface of the camera body.

11. The camera of claim 10, wherein the thermally conductive heat sink is thermally coupled to the thermally conductive heat diffuser, the heat sink dissipating the heat produced by the image sensor assembly to an exterior of the camera body.

12. A heat controller for transferring heat away from an image sensor, the heat controller comprising:
a thermally conductive heat source thermally coupled to the image sensor for absorbing heat from the image sensor, the heat source comprising a first material having a lateral thermal conductivity, an out of plane thermal conductivity, and a mechanical stiffness;
a thermally conductive heat exchange comprising the first material for transferring heat away from the image sensor;
a thermally conductive offset arm comprising the first material, the offset arm thermally coupling and physically connecting the heat source to the heat exchange and allowing transfer of heat from the heat source to the heat exchange;
a mechanical stabilizer coupled to one surface of the heat exchange comprising a second material, the second material having a mechanical stiffness higher than the first material;
a compressible spacer comprising a third material coupled to a surface of the mechanical stabilizer opposite the surface coupled to the heat exchange, the third material having an out of plane thermal conductivity less than the first material and a mechanical stiffness less than the first material.

13. The heat transfer apparatus of claim 12, wherein the offset arm displaces the heat source some distance from the heat exchange such that the surface of the heat source is laterally and vertically translated from the heat exchange.

14. The heat transfer apparatus of 12, wherein the first material has a higher lateral thermal conductivity than out of plane thermal conductivity.

15. The heat transfer apparatus of 12, wherein the second material has a material stiffness sufficient to allow the mechanical stabilizer to resist deformation of the heat exchange when compressed.

16. The heat transfer apparatus of 12, wherein the third material has a material stiffness that allows deformation of the compressible spacer when compressed.

17. The heat transfer apparatus of 12, wherein the heat source forms a square annulus able to surround the image sensor.

18. The heat transfer apparatus of 12, wherein the heat exchange is coupled to the mechanical stabilizer via a pressure sensitive adhesive.

19. The heat transfer apparatus of 12, wherein the heat source is coupled to the image sensor via a thermally conductive adhesive polymer.

20. The heat transfer apparatus of claim 12, further comprising a thermally conductive heat diffuser thermally coupled to the heat transfer apparatus for transferring heat away from the image sensor via the heat transfer apparatus.

* * * * *